United States Patent [19]

Tobita

[11] Patent Number: 4,771,457
[45] Date of Patent: Sep. 13, 1988

[54] SUBSCRIPTION TELEVISION SYSTEM

[75] Inventor: Katsumi Tobita, Soma, Japan

[73] Assignee: Alps Electric Co., Ltd., Japan

[21] Appl. No.: 51,165

[22] Filed: May 12, 1987

Related U.S. Application Data

[63] Continuation of Ser. No. 743,374, Jun. 11, 1985, abandoned.

[30] Foreign Application Priority Data

Jun. 11, 1984 [JP] Japan ............................. 59-118336

[51] Int. Cl.$^4$ ............................................. H04N 7/167
[52] U.S. Cl. ........................................ 380/15; 380/10
[58] Field of Search .................................. 380/15, 10

[56] References Cited

U.S. PATENT DOCUMENTS 3,478,166  11/1969  Reiter et al. .
3,813,482  5/1974   Blonder .
4,389,671  6/1983   Posner et al. .
4,542,407  9/1985   Cooper et al. .
4,562,465  12/1985  Glaab .
4,567,517  1/1986   Mobley .
4,568,974  2/1986   Toonder et al. .
4,590,519  5/1986   Zelenz .

Primary Examiner—Stephen C. Buczinski
Attorney, Agent, or Firm—Guy W. Shoup; Leighton K. Chong; Paul J. Winters

[57] ABSTRACT

A subscription television system sends out a reference level signal together with a timing pulse on the transmitting side and, on the receiving side, extracts the reference level signal and suppresses the signal of a video signal interval, except for a synchronizing pulse interval, on the basis of the extracted reference level signal, whereby a descrambling process is performed.

2 Claims, 5 Drawing Sheets

SUBSCRIPTION TELEVISION SYSTEM

This is a continuation application from application Ser. No. 743,374 filed June 11, 1985, now abandoned.

FIELD OF THE INVENTION

This invention relates to a subscription television system in which with respect to a specified broadcasting program, a contractor can watch TV exclusively.

BACKGROUND OF THE INVENTION

The subscription television system is well known in the art in which only the contractor can watch a specified broadcasting program on TV. That is, in the subscription television system, the specified broadcasting program is sent out on the transmitting side in the form of the scrambled TV signal in which the synchronizing pulse interval is suppressed a certain level. In case this scrambled TV signal is received by the usual TV set, the TV set can not be synchronized because the synchronizing pulse is suppressed, and the normal image can not be watched. On the contrary, the contractor can receive the normal picture by employment of a descrambler. The descrambler performs its descrambling process, by which the video signal interval of the received scrambled TV signal, except for the synchronizing pulse interval, is suppressed a certain level. This descrambled TV signal is applied to the TV set.

In more detail, FIG. 4(a) shows an example of a high-frequency envelop wave form of the scrambled TV signal. In this wave form the interval A inclusive of the horizontal synchronizing pulse HP and the color burst CB is suppressed a certain level. In addition, the interval of the vertical synchronizing pulse is also suppressed a certain level. The sound carrier is amplitude-modulated by a timing pulse signal shown in FIG. 4(b) and sent out together with a video signal.

On the receiving side, the timing pulse signal shown in FIG. 4(b) is extracted to create a control pulse signal shown in FIG. 4(c), the descrambling process is performed so that the video signal interval, except for the synchronizing pulse interval, is suppressed a certain level to create the TV signal having the normal relationship of levels, and the resultant TV signal is applied to the TV set.

FIG. 5 is a block diagram of the important portion of the conventional descrambler. In this drawing, the scrambled TV signal applied to an input terminal 8 is converted to a certain frequency by a frequency converter 1, and branched by a branching circuit 2 into two, one being applied to an amplifier 3 and the other being applied to a detector circuit 7. The timing pulse signal obtained through detection in the detector circuit 7 is applied to a decoder section 6, thereby the control pulse signal shown in FIG. 4(c) being created, which in turn is applied to switching circuits 10, 11. In operation, the switching circuits 10, 11 are turned to the contact a side during the synchronizing pulse interval, or these are turned to the contact b side during the video signal interval.

Attenuators 4, 5 are previously set to mutually different values of attenuation, the decoder section 6 controls switching circuits 12, 13 in response to the predetermined control information given from the transmitting side, and the switching circuits 12, 13 are turned and connected to either contact c or d so that either attenuator having a designated value of attenuation is connected to the switching circuits 10, 11. Accordingly, the output signal of the amplifier 3 during the synchronizing pulse interval is given to and output through an output terminal 9 without modification, whereas the output signal of the amplifier 3 during the video signal interval is attenuated a certain level by the attenuator 4 or 5 and output through the output terminal 9, whereby the normal level relationship is recovered between the synchronizing pulse interval and the video signal interval.

As apparent from the foregoing description, in the prior art, the attenuation values of the attenuators 4, 5 are required to be set in correspondence with the value of suppression on the transmitting side and, if the set attenuation values vary, the quality of received picture deteriorates. Specifically, against the scramble TV signal given from the transmitting side upon which the descrambling process is to be performed by connecting selectively plural attenuators 4, 5, the attenuation values of the attenuators 4, 5 must be set accurately. If the set attenuation values vary due to secular change or variation in temperature, a defect such as deterioration of picture quality or flashing of picture results.

SUMMARY OF THE INVENTION

The object of the present invention is to dissolve such defects as above.

In brief, in the subscription television system in which the scrambled TV signal whose synchronizing pulse interval is suppressed a certain level or whose video signal interval is raised a certain level is sent out on the transmitting side and, on the receiving side, the descrambled TV signal whose video signal interval, except for the synchronizing pulse interval, is suppressed a certain level is applied to the TV set; according to the present invention, the transmitting side is equipped with means for amplitude-modulating the sound carrier by a timing pulse signal synchronized with the synchronizing pulse and a reference signal for designating the certain level that is suppressed or raised in creating the scramble TV signal, and for sending out the same together with the video signal, and the receiving side is equipped with means for extracting the timing pulse signal and the reference signal and means for suppressing on the basis of the reference signal the video signal interval, except for the synchronizing pulse interval, obtained by the timing pulse signal, whereby the descrambling process is performed by controlling the ratio of suppression on the basis of the reference signal.

Functionally, the present invention sends out on the transmitting side the reference level signal together with the timing pulse and, on the receiving side, suppresses the video signal interval, except for the synchronizing pulse interval, on the basis of the reference level signal thereby to perform descrambling.

DETAILED DESCRIPTION OF THE INVENTION

The embodiment of the present invention will be described with reference to the drawings.

Figure 1:
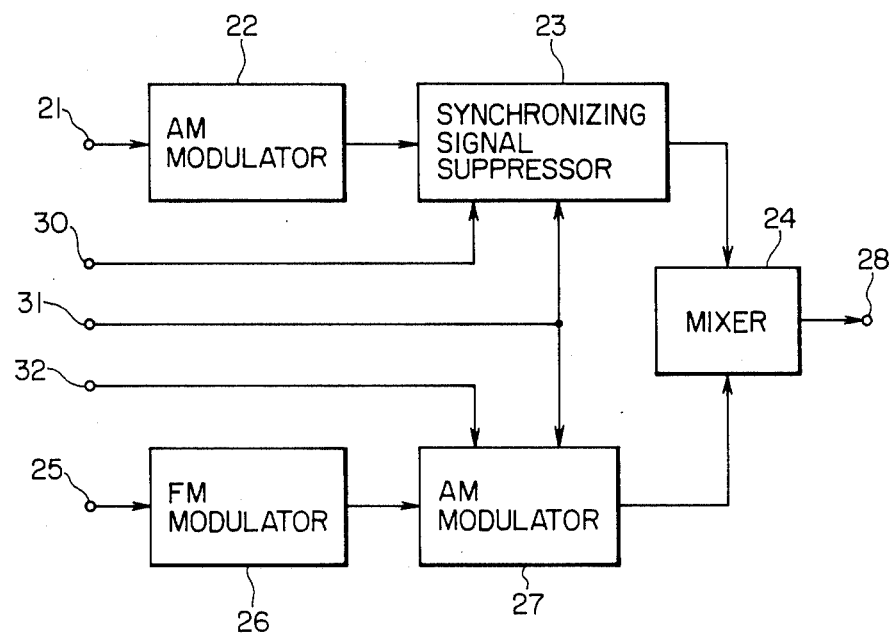
FIG. 1 is a block diagram of the important portion on the transmitting side of an embodiment according to the present invention.

FIG. 1 is the block diagram illustrating the important portion on the transmitting side of the embodiment of the present invention, in this drawing, 21 is a video signal input terminal, 22 is an AM modulator to amplitude-modulate the video signal, 23 is a suppressor for the synchronizing signal, 24 is a mixer, 25 is a sound signal input terminal, 26 is an FM modulator, 27 is an AM modulator to amplitude-modulate the sound carrier by a timing pulse signal, 28 is an output terminal, 30 is an input terminal for a pulse signal to control the synchronizing signal suppressor 23, 31 is an input terminal for a DC voltage to control the ratio of suppression, and 32 is an input terminal for the timing pulse signal including a reference signal. The video signal applied to the input terminal 21 is modulated by the AM modulator 22 and applied to the synchronizing signal suppressor 23, in which only the synchronizing pulse interval is suppressed by the pulse signal from the input terminal 30, where the ratio of suppression is controlled by the DC voltage from the input terminal 31.

On the other hand, the sound signal applied to the input terminal 25 is frequency-modulated by the FM modulator 26 and amplitude-modulated in the AM modulator 27 by the timing pulse signal, where its degree of modulation is controlled by the DC voltage applied to the input terminal 31. In the above operation, by coordinating the suppression degree in the synchronizing signal suppressor 23 with the suppression (modulation) degree in the AM modulator 27, the levels of these output signals can be made equal. Then, the output signal of the synchronizing signal suppressor 23 and the output signal of the AM modulator 27 are applied to the mixer 24, where these are mixed, the resultant signal is applied from the output terminal 28 to an output channel converter, for example, and transmitted through a certain channel.

In this way, the timing pulse signal for descrambling and the reference signal including the information of suppression ratio can be carried on the scrambled TV signal to be transmitted.

Figure 2:
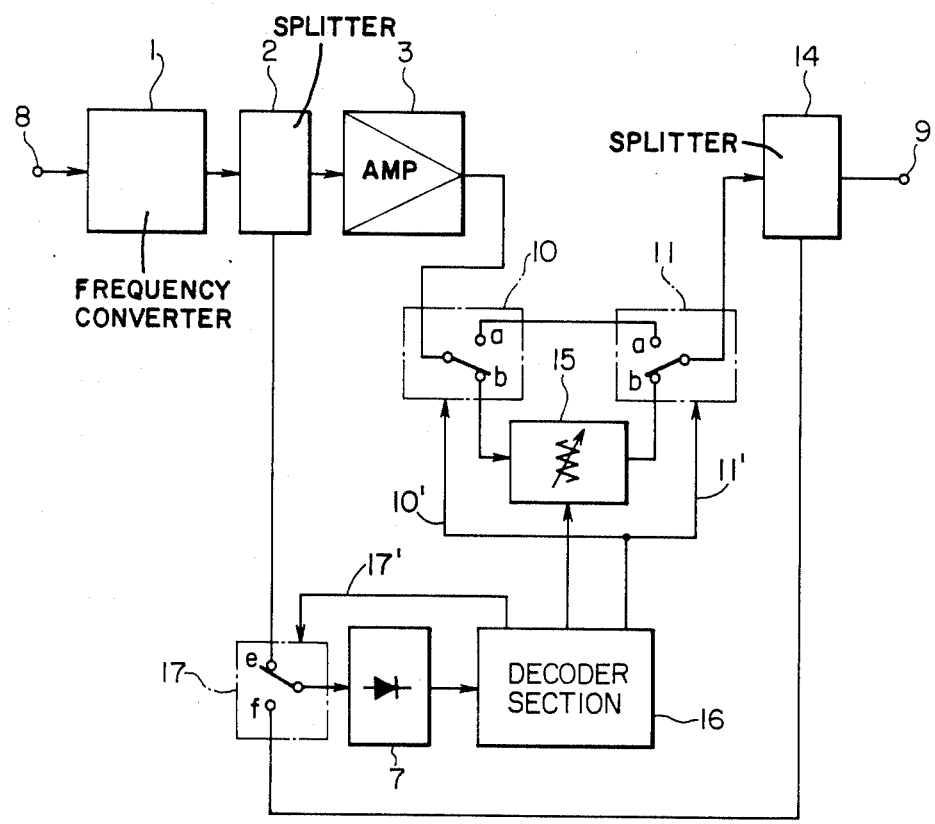
FIG. 2 is a block diagram of the important portion on the receiving side of the embodiment according to the present invention.
Figure 5:
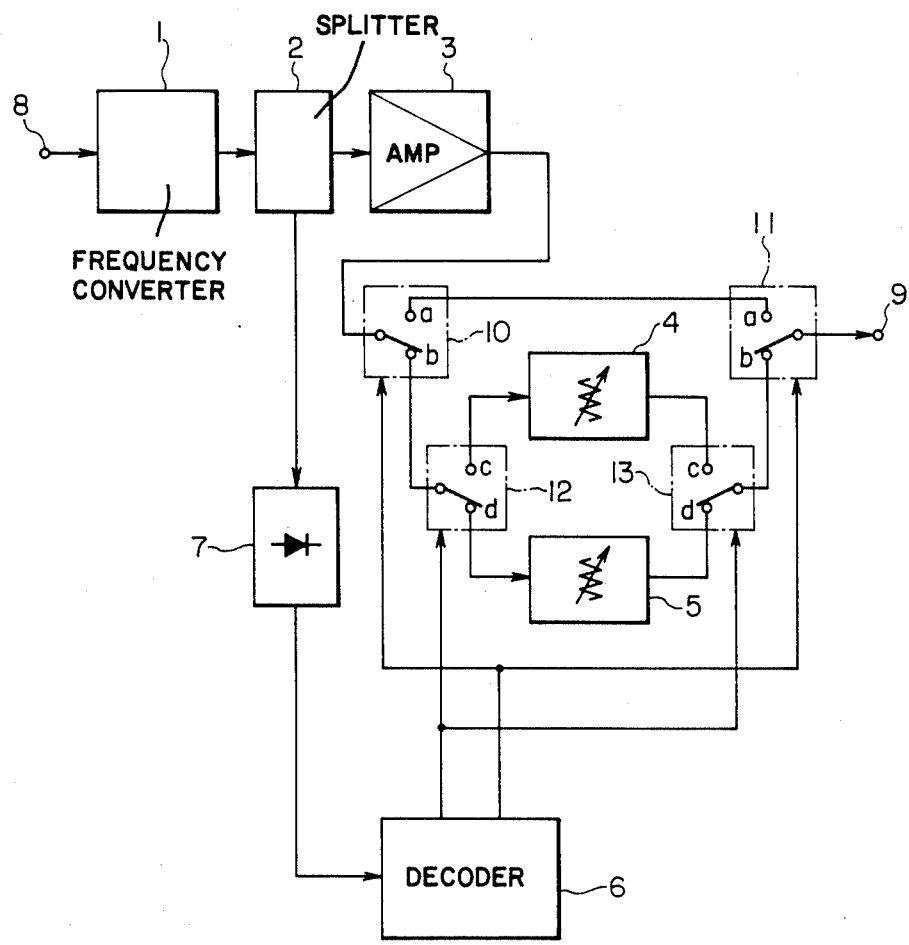
FIG. 5 is a block diagram of the important portion on the receiving side of the conventional system.

FIG. 2 is the block diagram illustrating the important portion on the receiving side of the embodiment according to the present invention, in which the same reference number as that shown in FIG. 5 designates the same element as that illustrated in FIG. 5. In FIG. 2, 14 is a branching circuit, 15 is a variable attenuator, 16 is a decoder section, and 17 is a switching circuit. The decoder section 16 is structured so that it outputs switching control signals to the switching circuits 10, 11 and 17, and a control signal to control the value of attenuation of the variable attenuator 15. Though the switching circuits 10, 11 and 17 are illustrated as the switches having contacts a, b, e, f, these may be composed of semiconductor switching elements such as transistors.

Figure 3:
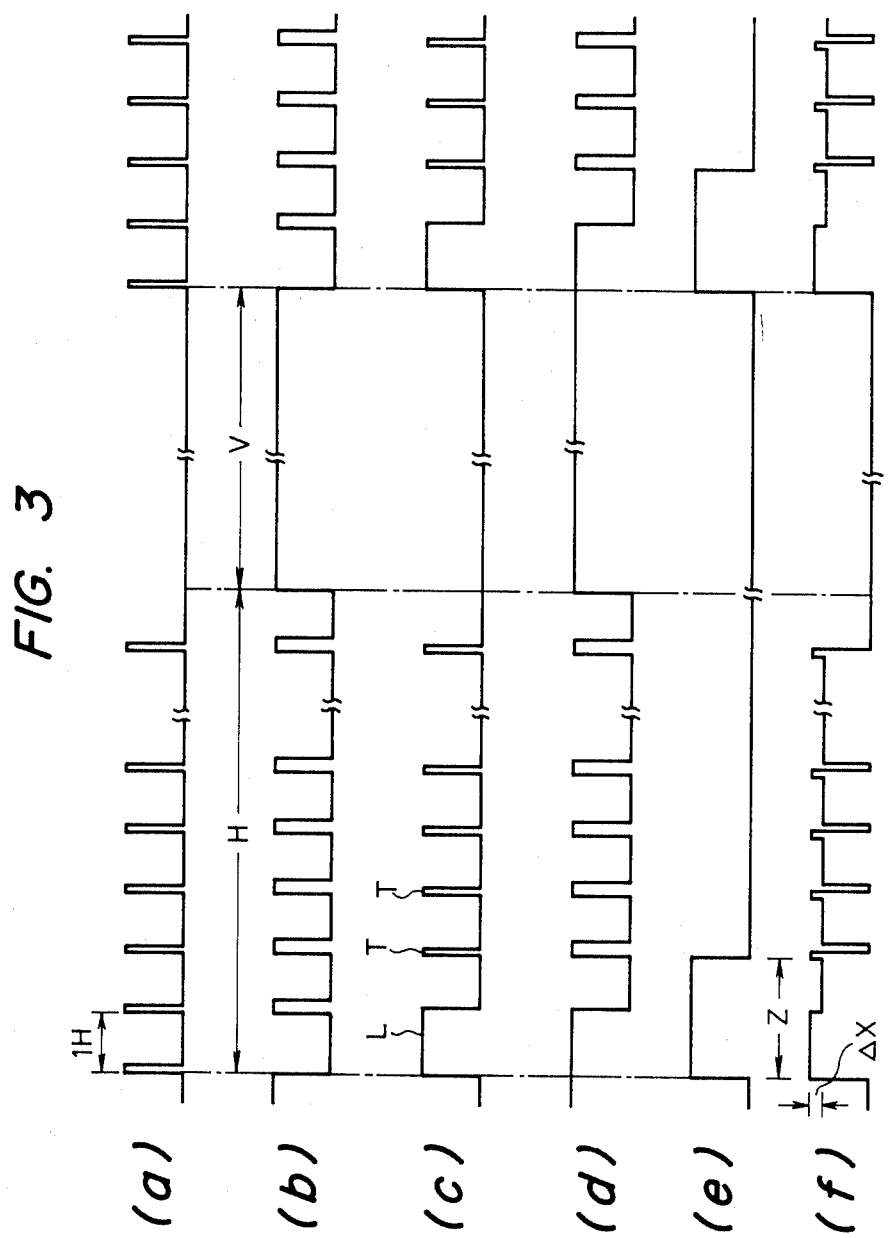
FIG. 3 is a timing diagram for explanation of the operation.
Figure 4:
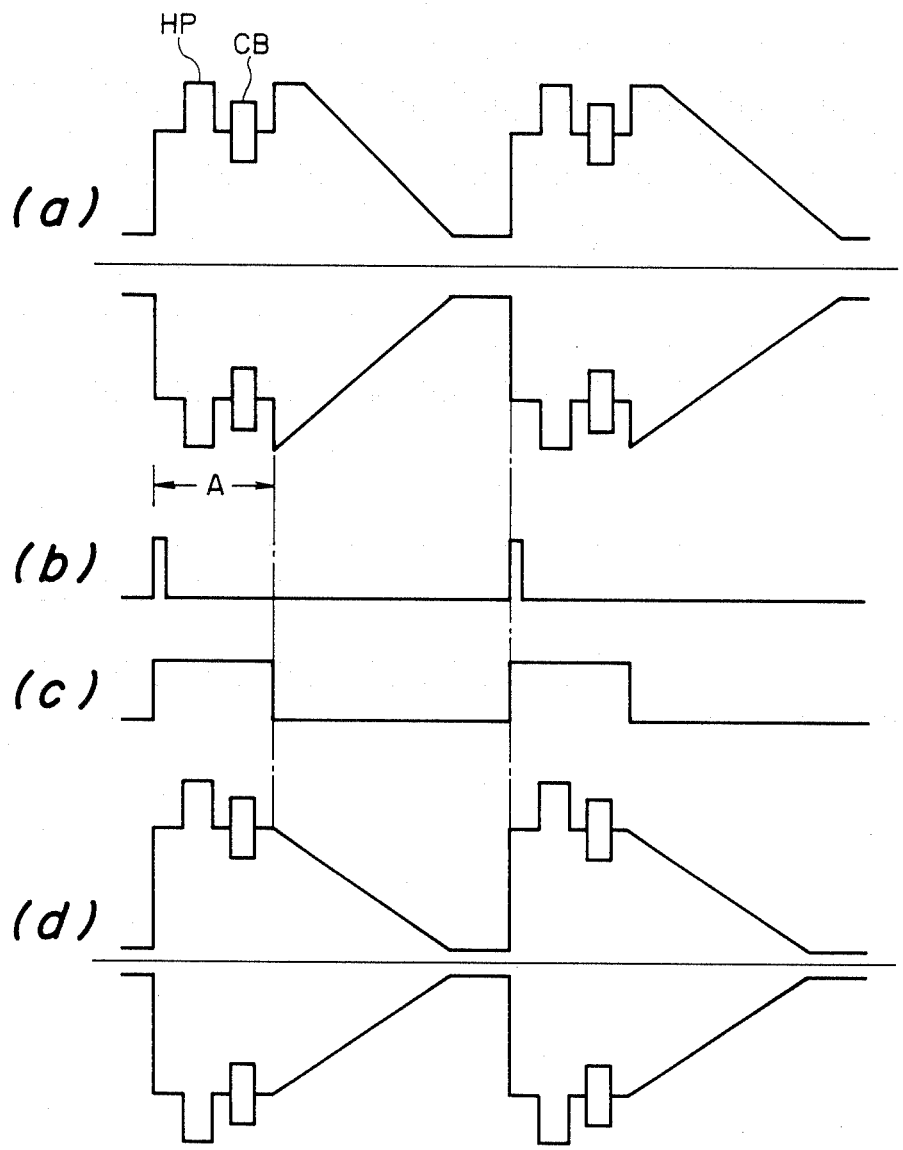
FIG. 4 is a timing diagram for explanation of the scrambling and descrambling processes.

FIG. 3 is the diagram for explanation of the operation, in which (a) and (b) are the timing pulse signal and the control signal to control the switching circuits 10 and 11, respectively, in the conventional system, (c) is the timing pulse signal in the present invention, (d) is the control signal to control the switching circuits 10, 11 in the present invention, (e) is the control signal to control the switching circuit 17, and (f) is the signal applied to the switching circuit 17 that is branched by the branching circuit 14. Further, H is the horizontal interval, V is the vertical interval, 1H is the interval of one horizontal scanning line, L is a comparison signal, T is the timing pulse, Z is the interval during which the switching circuit 17 has been turned to the contact f from the contact e by the control signal.

In the conventional system, the sound carrier is amplitude-modulated only by the timing pulse signal, thus, as shown in FIG. 3(a), the timing pulse signal is synchronized with each horizontal scanning line. On the contrary, in the present invention, as shown in FIG. 3(c), the output of the FM modulator 26, i.e., the sound carrier, is modulated in the AM modulator 27 shown in FIG. 1 by the use of the reference signal L and the timing pulse T at the degree of modulation corresponding to the DC voltage given from the input terminal 31, and sent out. For example, if the degree of level suppression for the synchronizing pulse interval is set to be 6 dB as designated by the DC voltage given from the input terminal 31, the modulation degree in the AM modulator 27 is adjusted to 6 dB (50%) too and, at this degree, the sound carrier is amplitude-modulated by the reference signal L and the timing pulse T. In modification, the information of suppression degree may be sent out in the form of the level of the reference signal L. Further, the time width of the reference signal L may be selected to be equal to the time width of one horizontal scanning line interval exclusive of the time of the synchronizing signal.

On the receiving side, the scrambled TV signal applied to the input terminal 8 is frequency-converted by the frequency converter 1, and branched by the branching circuit 2 into two, one branched signal being applied to the amplifier 3 and the other branched signal being applied to the contact e of the switching circuit 17. The switching operation of the switching circuit 17 is controlled by the decoder section 16, the control signal to control that switching operation is shown in FIG. 3(e), the switching circuit 17 is turned to the contact e side during the "0" interval of the control signal, whereas it is turned to the contact f side during the "1" interval.

When the switching circuit 17 is turned to the contact e side and the branched signal from the branching circuit 2 is applied to the detector circuit 7, the timing pulse signal amplitude-modulated on the sound carrier is detected and output to the decoder section 16. The decoder section 16 outputs the control signals 10', 11', 17' to control the switching circuits 10, 11, 17, respectively, the control signal 10' (11') to control the switching circuits 10, 11 being illustrated in FIG. 3(d). When this control signal is "1", the switching circuits 10, 11 are turned to the contact a side, and the output signal of the amplifier 3 is, without being attenuated, output to the output terminal 9 through the branching circuit 14. On the contrary, when the control signal is "0", the switching circuits 10, 11 are turned to the contact b side, and the output signal of the amplifier 3 is, after being attenuated by the variable attenuator 15, output to the output terminal 9 through the branching circuit 14. In this way, the video signal interval, except of the synchronizing pulse interval, is attenuated by the variable attenuator 15.

The control signal given from the decoder section 16 to control the switching circuit 17 is "1" during the interval Z, as shown in FIG. 3(e), by which the switching circuit 17 is turned to the contact f side. During this period, in place of the signal branched by the branching circuit 2, the descrambled signal branched by the branching circuit 14 is applied to the detector circuit 7.

The decoder section 16 detects the level difference Δx between the reference signal L and the signal attenuated by the variable attenuator 15 during the interval Z and controls the attenuation value of the variable attenuator 15 so that the difference Δx will become zero. Therefore, because the variable attenuator 15 can be controlled automatically, the stable descrambling process is achievable, thus, even when the degree of suppression is altered for the purpose of preventing unfair TV watching or TV poaching, the descrambling process can be performed in tracing that alteration.

In an actual receiving process, at first and until the decoder section 16 detects the reference signal L, the switching circuit 17 is turned to the contact e side and the signal branched by the branching circuit 2 is applied to the detector circuit 7. As the reference signal L is detected by the decoder section 16, this reference signal L is sampled and held until the interval Z containing the next reference signal L. In the succeeding intervals Z, while taking this held reference signal as the reference level signal, the attenuation value of the variable attenuator 15 is controlled so that the difference Δx shown in FIG. 3(f) will become zero.

As described hereinabove, the decoder section 16 has the structure so that it can discriminate the timing pulse T and the reference signal L, provide the switching control signal for the switching circuits 10, 11 and the switching control signal for the switching circuit 17, and provide the attenuation value-control signal for the variable attenuator 15 on the basis of the reference signal L. Thus, the decoder section may be composed by a combination of comparator circuits, logic circuits and the like, or by a micro-processor operable through program control.

As the position where the reference signal L is to be included, the following is adequate: (1) the vertical synchronizing period; (2) a portion of the vertical synchronizing period; (3) a portion of the beginning section of the horizontal synchronizing period; and (4) a portion of the terminating section of the horizontal synchronizing period, that is, a period not used actually for the TV picture may be utilized. Because the reference signal (L)-containing period Z which may be any one of (1) through (4) noted above can be discriminated easily through detection of the vertical or horizontal synchronizing period, the switching control signal 17' for the switching circuit 17 can be created easily by the decoder section 16. For instance, it will be understood in viewing FIG. 3 that the present system can be realized by changing the switching control signal to "1" upon detection of the end of the vertical interval V and to "0" after the two horizontal scanning lines-interval has elapsed.

Further, though the reference signal L has the length corresponding to the one horizontal scanning line interval, as shown in FIG. 3(c), the present invention does not need to be limited to the above, rather, the reference signal may be made narrower in time width than the above if detecting and controlling are possible on the receiving side.

As described hereinabove, the present invention amplitude-modulates the sound carrier by the use of the timing pulse T and the reference signal L designating the degree of suppression, used later for descrambling, and sends out the same and, on the receiving side, detects the reference signal L and thereby controls the variable attenuator 15. Accordingly, the attenuation value of the variable attenuator 15 can be controlled accurately in correspondence with the degree of suppression of the synchronizing pulse interval, or the degree of level raising of the video signal interval, specified on the transmitting side. Therefore, level variation caused by secular change, variation in temperature, and the like can be compensated automatically, and the descrambling process is stabilized. Furthermore, even when the degree of suppression is altered on the transmitting side within a certain range for the purpose of preventing TV poaching, the degree of attenuation on the receiving side can be controlled in compliance with the altered degree, thus, the present system is very effective.

While the preferred embodiment has been described, variations thereto will occur to those skilled in the art within the scope of the present inventive concepts which are delineated by the following claims.

What is claimed is:

1. A subscription television system of the type in which a TV signal, including a sound carrier and a video carrier having synchronizing signal intervals and video signal intervals, is scrambled by a scrambler unit on a transmitting side of the system, and a descrambler unit of a subscriber on a receiving side of the system descrambles the received TV signal in order to apply it to a TV set of the subscriber for viewing, said system comprising:

said scrambler unit having first means for suppressing the level of the synchronizing signal intervals relative to the level of the video signal intervals of the video carrier from their original relationship in accordance with a given ratio of suppression and a synchronizing pulse signal, and second means for amplitude modulating the sound carrier by applying a reference level signal corresponding to the ratio of suppression of the synchronizing signal intervals relative to the video signal intervals and by applying a timing pulse signal; and said descrambler unit including:

(a) a branching circuit connected to an input of said descrambler unit for branching the received TV signal;

(b) switching means for applying a branched received TV signal from said branching circuit to a decoder section;

(c) a circuit receiving a branched TV signal from said branching circuit for switching between a first state in which the branched received TV signal is passed without modification as an output TV signal, and a second state for applying the branched received TV signal to a variable attenuator unit;

(d) the variable attenuator unit for modifying the level of the video carrier of the TV signal received from said switching circuit in accordance with a level control signal applied thereto and outputting an output TV signal;

(e) the decoder section for extracting said reference level signal and said timing pulse signals from the sound carrier of the received TV signal, for providing a switching control signal based on said extracted timing pulse signals for switching said switching circuit between the first state, wherein the branched received TV signal not having said synchronizing signal intervals and said video signal intervals suppressed in relative level is output as said output TV signal, and the second state, wherein the branched received TV signal having the level of the synchronizing signal intervals suppressed relative to the level of the video signal intervals is applied to the variable attenuator unit, and for providing a level control signal for controlling said variable attenuator unit in accordance with said reference level signal extracted from the sound carrier such that the level of the synchronizing signal intervals of the video carrier relative to the level of the video signal intervals is restored to their original relationship, whereby the received TV signal is descrambled and provided as an output TV signal; and a second branching circuit connected to receive said output TV signal from said switching circuit for branching the output TV signal, and wherein said means for applying the branched received TV signal to said decoder section is a second switching circuit for switching between a first state wherein the branched received TV signal is provided to said decoder section from said first-mentioned branching circuit and a second state wherein the branched output TV signal is provided to said decoder section from said second branching circuit, and further wherein said decoder section provides a second switching control signal for periodically switching said second switching circuit to said second state whereupon said decoder section compares the relative levels of said synchronizing and video signal intervals of the output TV signal with the reference level signal and adjusts said variable attenuator unit to correct for any difference between the relative levels of the output TV signal and the reference signal level.

2. A subscription television system according to claim 1 further comprising an amplifier provided between said branching circuit and said switching circuit for amplifying the overall level of the branched TV signal from said branching circuit, and wherein said first means of said scrambler unit suppresses the level of said synchronizing signal interval by a predetermined level, said reference level signal represents said predetermined level, and said variable attenuator unit of said descrambler unit attenuates the level of said video signal interval by said predetermined level in accordance with said extracted reference level signal, whereby the level of the synchronizing signal interval relative to the level of the video signal interval is restored to their original relationship.

* * * * *